United States Patent [19]

Withiam

[11] Patent Number: 5,085,705
[45] Date of Patent: Feb. 4, 1992

[54] ALUMINA-SILICA-SULFATES, METHOD OF PREPARATION AND COMPOSITIONS

[75] Inventor: Michael C. Withiam, Elkton, Md.

[73] Assignee: J.M. Huber Corporation, Rumson, N.J.

[21] Appl. No.: 637,917

[22] Filed: Jan. 7, 1991

Related U.S. Application Data

[62] Division of Ser. No. 296,095, Jan. 12, 1989, Pat. No. 5,030,284.

[51] Int. Cl.$^5$ ............................................. C09B 14/04
[52] U.S. Cl. ............................. 106/287.17; 524/418; 524/423; 524/925; 524/929; 162/181.3; 106/287.32; 523/443; 423/518; 423/330
[58] Field of Search ............... 524/418, 423, 925, 929; 162/181.3; 106/287.17, 409, 426, 427, 431, 461, 287.32; 501/33; 523/443; 423/3, 518

[56] References Cited

U.S. PATENT DOCUMENTS

| | | |
|---|---|---|
| 1,515,007 | 11/1924 | Behrman . |
| 1,736,281 | 11/1929 | Behrman . |
| 2,302,297 | 11/1942 | Connolly . |
| 2,768,145 | 1/1951 | Tongue et al. . |
| 3,041,269 | 6/1962 | Anderson . |
| 3,424,602 | 1/1969 | Nauroth . |
| 3,533,738 | 10/1970 | Rundell . |
| 3,551,014 | 1/1971 | Kimberlin et al. . |
| 3,582,379 | 6/1971 | Hackbarth . |
| 3,832,327 | 8/1974 | Hackbarth . |
| 3,993,499 | 11/1976 | Jacobson et al. . |
| 4,201,689 | 5/1980 | Smolka . |
| 4,247,420 | 1/1981 | Dumoulin et al. . |
| 4,267,158 | 5/1981 | Christophliemk et al. . |
| 4,275,048 | 6/1981 | Stein et al. . |
| 4,448,599 | 5/1984 | Mackenzie et al. . |
| 4,698,317 | 10/1987 | Inoue et al. . |
| 4,751,203 | 6/1988 | Toussaint et al. . |
| 4,764,218 | 8/1988 | Kobayashi et al. . |

*Primary Examiner*—Karl Group
*Attorney, Agent, or Firm*—Harold H. Flanders; Alec H. Horn; Robert L. Price

[57] ABSTRACT

An alumina-silica-sulfate of the formula $$xR:Al_2O_3:ySiO_2:zSO_4 \cdot pH_2O$$

wherein R is an alkali or alkaline earth metal oxide, a transition metal capable of forming a sulfate salt or mixtures thereof, x is about 0.001 to 0.5, y is about 0.01 to 3.00, z is about 0.00 to 3.00, and p is about 0 to 100.00, and wherein the sulfate is present as a bound network. Compositions comprising the alumina-silica-sulfate of the invention and a carrier, articles of manufacture comprising the alumina-silica-sulfates of the invention in the form of a catalyst, rubber, plastics, paint and paper, among others. Hollow microspheres are formed by spray drying a gelled composition. Hollow microspheres containing a porous network are formed by calcining the spray-dried hollow microspheres to eliminate the sulfate network.

48 Claims, No Drawings

ALUMINA-SILICA-SULFATES, METHOD OF PREPARATION AND COMPOSITIONS

This is a continuation of application Ser. No. 07/296,095, filed 1/12/89, now U.S. Pat. No. 5,030,284.

FIELD OF THE INVENTION

This invention relates to alkali metal, alkaline earth metal and transition metal alumina-silica-sulfates which contain a sulfate network within the composition, compositions thereof and a method of preparing the alumina-silica-sulfates from a slurry comprising a source of reactive silicate and the metal ions and an aqueous medium comprising reactive aluminum and sulfate ions. The alumina-silica-sulfates of the invention can be produced in the form of sols, solid particulate materials, calcined products and microspheres such as hollow microspheres. They are useful as binders or as matrix materials when combined with other products to produce beads or granules having a high degree of integrity. They are also useful as catalyst-support materials, desiccants, conditioners and fillers for rubber, plastic, paint and paper products to provide bulking, reinforcing, opacifying and flatting characteristics.

BACKGROUND OF THE INVENTION

It is known in the art to prepare a variety of alumina-silicate products utilizing a variety of silica and alumina sources.

U.S. Pat. No. 4,247,420 to Dumoulin et al relates to the preparation of hydrocarbon conversion catalysts by mixing a sodium silicate solution with an aluminum sulfate solution at a pH 9.0-9.6. To this co-gel a sodium aluminate solution is added to a pH 11.8-12.2. Alum is added again to a pH 3.5-4.0. A zeolite Y and/or a sodium silicate solution are then added and the precipitate slurry is filtered and washed to remove soluble sodium sulfate and dried. This process and product obtained thereof are different from those of the present invention in that a sodium silicate solution is utilized and that a co-gel is formed when the aluminum sulfate solution is added rather than a solution or sol when a source of silica or silicate is mixed with the alum. The proportions of the different components of this product are in addition different from those of the product of the invention.

U.S. Pat. No. 3,424,602 to Nauroth mixes a soluble sodium silicate with an aluminum sulfate solution to form sodium alumino silicate precipitates. The final product is also different from the alumina-silica-sulfates of this invention in that the precipitate is a product substantially lacking in sulfate content, with sulfate only present as sodium sulfate by-product.

U.S. Pat. No. 2,768,145 to Tongue first produces a conventional silica gel by reacting an acid and a sodium silicate solution (no aluminum is present at this point). The precipitation-gelation of particles in the slurry is completed by adding sulfuric acid. The resulting particles of silica hydrogel are then impregnated with aluminum by adding a solution of aluminum sulfate to the acidified slurry. The aluminum is precipitated as a substantially insoluble hydrated alumina by the further addition of aqueous ammonia. The resulting product is spray-dried to form spherical particles which do not contain sulfate.

U.S. Pat. Nos. 3,582,379 and 3,832,327 to Hackbarth relate to the production of alkali metal alumino silicates prepared by reacting dilute aqueous solutions of an alkali metal silicate and a water soluble aluminum salt such as aluminum sulfate. No sols or gels are formed in this process.

U.S. Pat. Nos. 1,515,007 and 1,736,281 to Behrman disclose methods for the preparation of gel materials by reacting a solution of sodium silicate and a solution of aluminum sulfate. The term "gel" is used in the Behrman patent to represent precipitated sodium alumino silicates similar to the aforementioned Hackbarth patents. After the precipitate is obtained, it is dried and then washed to remove any soluble sodium sulfate remaining therein.

U.S. Pat. No. 3,041,269 to Anderson relates to a process for producing a hydrocarbon cracking catalyst containing silica, alumina and barium sulfate. The silica and alumina are present as a silica-alumina sol having a pH 8.0-9.0 and the barium sulfate is dispersed therewithin. Once obtained the mixture is base-exchanged and washed to a point where it is salt free, i.e., sulfate free. More specifically, the aluminum sulfate contains added sulfuric acid and the silica is in the form of a sodium silicate solution. These two solutions are reacted in the presence of added insoluble barium sulfate. The reactants are mixed in a spray head and spheres are formed by adding this gel slurry into an oil medium.

U.S. Pat. No. 2,551,014 to Kimberlin provides a process comprising the addition of aluminum sulfate to a silica hydrosol, and the further addition of an insoluble magnesium oxide slurry. The slurry is added into an oil to form the microspheres which are then washed salt free, i.e., sulfate-free.

U.S. Pat. No. 2,302,297 to Connolly relates to a process comprising mixing soluble sodium silicate and aluminum sulfate solution to form a silica-alumina hydrogel containing soluble sodium sulfate. The silica:alumina molar ratio of the product is 2.0:15.0, which is substantially higher than the silica: alumina ratio in the product of the present invention.

U.S. Pat. No. 3,533,738 to Rundell discloses a process which comprises producing a solution of soluble sodium silicate having an excess of sodium hydroxide, and then reacting it with a solution of either a combination of sodium aluminate and aluminum nitrate in one example or with aluminum nitrate only in another example. A co-gel formed is then spray-dried, calcined, washed and ammonium sulfate-exchanged to remove $Na_2O$. The product is exchanged after drying and before calcining. The claimed level of $Na_2O$ in the Rundell patent is about 0.20 wt. % which is substantially below the minimum 1.0 wt. % of the present alumina-silica-sulfate. The product does not appear to contain bound sulfate. Although spray dried, it is not specifically stated in this patent whether a spherical product is obtained or desired. The emphasis of the Rundell patent is the production of synthetic mullite by calcining.

U.S. Pat. No. 3,993,499 to Jacobson discloses a process comprising reacting dry sodium silicate and aluminum sulfate in the presence of additional sodium sulfate and/or sodium chloride to form a gel which is then dried, leached, fired to remove sulfate and form mullite preferably in the form of fibrils. The products obtained by Jacobson contain excess alkali metal sulfate or chloride salt added to promote mullite fibril growth which is absent in the present invention. Jacobson also mixes the reactants, including the excess salts, to form a hard gel which is then dried in a brick, calcined and then leached to remove sulfates. In order to avoid the formation of mullite in the present invention the reaction mixture is maintained as a sol to facilitate its spray drying to form microspheres.

The present invention provides novel alumina-silica-sulfates, microspheres thereof, compositions thereof which are useful as desiccants, carriers, and catalyst supports and a method of preparing the products.

None of the prior art patents teach the novel alumina-silica-sulfate compositions of the invention or the method of their synthesis as described herein. The products of the present invention are unique and useful products.

SUMMARY OF THE INVENTION

In one aspect, this invention relates to alumina-silica-sulfate compositions containing a bound sulfate network within the composition having the formula:

wherein
R is selected from the group consisting of alkali metal oxides, alkaline earth metal oxides, transition metals capable of forming sulfate salts and mixtures thereof; and wherein
x is about 0.001 to 0.5;
y is about 0.01 to 3.00;
z is about 0.01 to 3.00; and
p is about 0 to 100.00.

The alumina-silica-sulfate may be in the solid form such as microspheres or in the form of a sol. The sulfate in the composition is in the form of bound sulfate.

This invention also encompasses disintegration-resistant beads or granules comprising at least a binding amount of the alumina-silica-sulfate of the invention and at most completely composed of the alumina-silica-sulfate of this invention.

Also encompassed in this invention is a rubber composition comprising a rubber and at least a bulking, reinforcing, opacifying or flatting amount of the alumina-silica-sulfate of the invention.

Yet another aspect of the invention is a plastic composition comprising a plastic and at least a bulking, reinforcing, opacifying or flatting amount of the alumina-silica-sulfate of the invention.

Also part of the invention is a paint composition comprising a paint and at least a bulking, reinforcing, opacifying or flatting amount of the alumina-silica-sulfate of the invention.

In another form, the invention encompasses a paper composition comprising paper pulp and at least a bulking, reinforcing, opacifying or flatting amount of the alumina-silica sulfate of the invention.

A chemical desiccant or conditioner is also part of the invention which comprises at least a desiccating or conditioning amount of the alumina-silica-sulfate of the invention.

Another aspect of the invention is a method of preparing an amorphous alumina-silica-sulfate of the formula

wherein R is selected from alkali and alkaline earth metal oxides, transition metals capable of forming sulfate salts and mixtures thereof; x is about 0.001 to 0.5; y is about 0.01 to 3.00; z is about 0.01 to 3.00; and p is about to 100.00, said method comprising (a) contacting a slurry comprising a source of reactive silicate and a salt of an alkali metal, an alkaline earth metal or a transition metal capable of forming a sulfate salt with an aqueous solution containing a reactive alumina and sulfate ions to form a mixed slurry, said silica, salt, alumina and sulfate being present in proportions effective to form said alumina-silica-sulfate;

(b) maintaining said mixed slurry under conditions of pH, temperature and pressure effective to form said alumina-silica-sulfate product; and (c) maintaining said mixed slurry at a temperature of about 15° to 98° C. and a pressure of about 15 to 100 psi for a period of time of about 5 minutes to 16 hours to form a sol or gel as desired to result in the conversion to said silica-alumina-sulfate product.

In a further aspect of the present invention, there are provided higher integrity particulates which have the following composition:

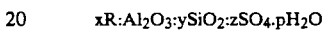

wherein
R is selected from the group consisting of alkali metal oxides, alkaline earth metal oxides, transition metals capable of forming sulfate salts and mixtures thereof; and wherein
x is about 0.001 to 0.5;
y is about 0.01 to 3.00;
z is about 0.00 to 3.00; and
p is about 0 to 100.00.

These compositions are formed by heating the alumina-silica-sulfate compositions of the present invention to temperatures in the range of 500° to 900° C. as in a calcining operation. In this process, the elevated temperatures cause elimination or at least substantial elimination or decomposition of the bound sulfate. This results in a particulate product which has pores therein which have a diameter of 100 Angstroms or less, the pores resulting from sulfate elimination. These particulate products have improved light-scattering, bulking and reinforcing characteristics.

In general, the hollow microspheres are produced from the alumina-silica-sulfate compositions of the invention by initially forming the sol as described, spray drying the sol to form hollow microspheres then calcining the microspheres to eliminate or substantially decompose the sulfate network.

Other objects, advantages and features of the present invention will become apparent to those skilled in the art from the following discussion.

DESCRIPTION OF THE PREFERRED EMBODIMENTS

The novel silica-alumina-sulfate compositions of this invention contain alkali metal or alkaline earth metal oxides, transition metals or mixtures thereof, alumina, silica and sulfate portions in specified proportions. These novel synthetic products or pigments are useful as reinforcing agents, reinforcing extenders, functional fillers for paper, paints, plastics and rubber to provide bulking, reinforcing, opacifying or flatting characteristics. They are also useful as desiccants and as conditioners as well as binders or as part of a matrix material when combined with other materials or alone to produce beads or granules with a high degree of integrity.

The novel synthetic alumina-silica-sulfates of the invention contain bound sulfate within the molecule and have the formula:

$$xR:Al_2O_3:ySiO_2:zSO_4.pH_2O$$

wherein
- R is selected from the group consisting of alkali and alkaline earth metal oxides, transition metals capable of forming sulfate salts and mixtures thereof;
- x is about 0.001 to 0.5;
- y is about 0.01 to 3.00;
- z is about 0.01 to 3.00; and
- p is about 0 to 100.00.

A preferred embodiment is that where the alumina-silica-sulfate of the invention has the following characteristics: x is 0.05 to 0.4, y is 0.02 to 2.85, z is 0.02 to 2.50, and p is 0.1 to 20.00. A still more preferred product is where p is 0.1 (substantially anhydrous product).

In one preferred embodiment of the invention the novel synthetic alumina-silica-sulfates of the invention are prepared from a batch composition containing the reacting components in the following proportions:

$$SiO_2/Al_2O_3 = \text{about } 0.01-3.00;$$

$$R/SiO_2 = \text{about } 0.003-0.50;$$

$$Al_2O_3/SO_4 = \text{about } 0.33-0.65; \text{ and}$$

$$H_2O/SO_4 = \text{about } 10.00-50.00.$$

The novel alumina-silica-sulfate of the invention may be in solid form, or in the form of a sol or gel. It may also be dried and/or calcined and thereby rendered insoluble in a medium such as water. In one aspect of the invention the novel composition is an amorphous alumina-silica-sulfate.

When in solid form the novel alumina-silica-sulfate of the invention may be in the form of microspheres such as hollow microspheres which may be obtained by spray drying methods known in the art.

The novel synthetic alumina-silica-sulfate of the invention may also be provided in the form of a sol, a gel or a solution. Preferred are water compositions where the alumina-silica-sulfate is present in an amount of about 5.0 to 50.0 wt. %, and more preferred, 20.0 to 40.0 wt. % of the composition. The composition can be formed as disintegration-resistant beads or granules comprising at least a binding amount of the alumina-silica-sulfates of the invention. The beads or granules are resistant to disintegration by shear. These compositions suitably contain about 1.0 to 25.0 wt. %, and preferably 2.0 to 10.0 wt. % of the sulfate of the invention calculated with respect to the weight of the composition when used as a binder. However, other binder materials may also be utilized in the formation of beads or granules.

A sol may be prepared by forming the batch from a mixture of alkali metal alumina slurry and aluminum sulfate solution by adding the slurry to the solution at elevated temperature, e.g., 50°-75° C. The resulting slurry is maintained at temperature for 1-3 hours and allowed to cool. On cooling the solution forms a clear sol.

A granulated silica product may be formed by fluidizing the dry silica powder and adding thereto a sol such as prepared above. Mixing in the fluidizer is then continued until the sol is evenly distributed and evenly dispersed on the silica powder. The granulated silica is then recovered, dried and fine and very coarse fractions removed to form a free flowing granulated product.

The novel synthetic materials of this invention can also be provided as a catalyst-support composition comprising as a functional catalyst support the alumina-silica-sulfate of the invention. The catalyst-support composition described above may also be provided as an article of manufacture in the form of catalyst composition comprising a suitable catalyst and at least a catalyst-supporting amount of the alumina-silica-sulfates of the invention.

A rubber bulking, reinforcing, opacifying or flatting composition is also provided by this invention which comprises as a functional bulking, reinforcing, opacifying or flatting agent the alumina-silica-sulfate of the invention. This composition can be utilized in an article of manufacture such as a rubber composition comprising a rubber and at least a bulking, reinforcing, opacifying or flatting amount of the alumina-silica-sulfate of the invention.

The novel products are also provided as a chemical desiccant or conditioner composition comprising as a functional chemical desiccant or conditioner the alumina-silica-sulfates of the invention.

Also provided herein is a plastics color-concentrate composition comprising as a functional filler about 2 to 50 wt. % of the alumina-silica-sulfate of the invention. This color-concentrate is also provided as an article of manufacture in the form of a plastics composition comprising a plastic and at least a bulking, reinforcing, opacifying or flatting amount (about 2 to 50 wt. %) of the alumina-silica-sulfate of this invention.

A paint bulking, reinforcing, opacifying or flatting composition is also provided which comprises as a functional bulking, reinforcing, opacifying or flatting agent, about 2 to 25 wt. % of the alumina-silica-sulfate of the invention. This concentrate can be utilized in an article of manufacture such as a paint composition comprising a paint and at least a bulking, reinforcing, opacifying or flatting amount of the alumina-silica-sulfate of this invention.

Also provided herein is a paper filler composition comprising as a functional filler about 2 to 10 wt. % of the alumina-silica-sulfate of the invention. This concentrate may also be provided as an article of manufacture in the form of a paper or newsprint composition comprising paper pulp and at least a bulking, reinforcing, opacifying or flatting amount of the alumina-silica-sulfate of this invention.

Additives and fillers for the above compositions and articles of manufacture and the amounts thereof are known in the art and need not be described herein.

In addition, a person with average knowledge of the art would know the proportion in which these additives and fillers are to be added into the preparations for the manufacture of the respective articles of manufacture.

The novel alumina-silica-sulfates of the invention are produced by the reaction of a slurry comprising a source of reactive silica or silicate and ions of an alkali metal, an alkaline earth metal or a transition metal capable of forming a sulfate salt with an aqueous medium comprising a reactive alumina and sulfate ions to form a mixed slurry. The silica, metal ions, alumina and sulfate ions are present in a proportion effective to form the alumina-silica-sulfate product.

Particularly suitable sources of reactive silica are silicate salts of an alkali metal and alkaline earth metal silicates. Suitable materials to provide the metal ions to the slurry are inorganic or organic salts of alkali metals, alkaline earth metals or a transition metal capable of forming sulfate salts. Preferred metals are Ni, Zn, and Zr, Na, K, and Ca salts, among others.

The source of alumina is suitably a reactive alumina selected from aluminum salts such as aluminum sulfate. The source of sulfate ions may be soluble sulfate salts, and a preferred salt is aluminum sulfate.

The composition of the sols may be varied by varying the degree of sol formation. This can be attained by controlling the amounts of both silica and water added. The amount of silica can be varied within the confines of the proportions described above.

Thereafter, the mixed slurry is maintained under conditions of pH, temperature and pressure which are effective to form the alumina-silica-sulfate product of the formula described above.

The pH of the mixed slurry is preferably maintained at about 3 to 5, and more preferably 3 to 4. The temperature is preferably maintained at about 50° to 100° C. and more preferably about 88° to 98° C. The pressure is preferably maintained at about 15 to 100 psi. The above conditions are maintained for a period of about 5 min to 16 hours, and more preferably 10 min to 4 hours.

The thus obtained solution, sol or gel of the alumina-silica-sulfate product is optically clear and contains a minimum of undissolved or unreacted material.

In a particular embodiment of the invention the method of obtaining the alumina-silica-sulfate of the invention may further comprise drying the solution, sol or gel and comminuting the dried sol to produce a particulate alumina-silica-sulfate product. A variety of conditions may be utilized for this step but preferred are a temperature of about 50° to 300° C., and atmospheric pressure for a period of time of about 2 to 24 hours, and preferred 10 to 15 hours.

The comminuting can be attained by milling or other mechanical methods resulting in a particulate product having suitably a 1 to 10 μm particle size, and more preferably 3 to 5 μm particle size. Different apparatus which can be utilized for drying and comminuting the sol are known in the art and need not be described herein.

When an insoluble alumina-silica-sulfate product is desired, either the sol or the solid product may be calcined under conditions of temperature and pressure which are known in the art. Typically, the calcination of the alumina-silica-sulfate may be conducted at a temperature of about 500° to 1000° C., and preferably about 800° to 900° C. for a period of time of about 1 to 16 hours, and more preferably 2 to 5 hours.

In a further preferred embodiment of the invention the alumina-silica-sulfate sol may be spray-dried to form alumina-silica-sulfate microspheres. This step is conducted by utilizing known technologies which an artisan may implement without undue experimentation or further invention. Typically the microspheres produced are hollow microspheres. If an insoluble product is desired, the microspheres may be calcined utilizing the conditions indicated above.

In a particularly preferred embodiment of the present invention, the sol produced according to the process of the invention is converted into a microsphere, and preferably a hollow microsphere from which most or all of the sulfate network has been eliminated. To produce the microspheres, the sol is first subjected to spray drying, preferably under conventional spray drying conditions such as an inlet temperature of 900° to 1100° F. and an outlet temperature of 200° to 300° F. The spray drying process produces hollow microspheres from the alumina-silica-sulfates of the invention. These microspheres are then subjected to calcination at temperatures of 500° to 900° C. under which conditions, the hollow microspheres are formed which also have pores in the wall structure of the microspheres. These pores are formed because the calcination causes decomposition and total or at least partial elimination of the sulfate network from the composition and results in hollow microspheres having diameters in the range of about 50 microns. The pores in the walls of the microspheres are sized in the range of about 100 Angstroms or less. The resulting products have improved light scattering, bulking and reinforcing characteristics. They are particularly useful as a filler for paper and paint, but are also useful in other areas which require bulking or reinforcing characteristics and light scattering effects.

Having now generally described this invention, the same will be better understood by reference to certain specific examples, which are included herein for purposes of illustration only and are not intended to be limiting of the invention or any embodiment thereof, unless so specified. In the specifications and throughout the disclosure, parts are by weight unless otherwise indicated.

EXAMPLES

EXAMPLE 1

Preparation of a sodium oxide-alumina-silica-sulfate gel

A batch of gel product is prepared by adding 1014.00 g of sodium alumino silicate slurry of the composition 7.77 wt. % $Na_2O$, 12.79 wt. % $Al_2O_3$, 15.05 wt. % $SiO_2$ to a 4345.00 g aluminum sulfate solution $Al_2(SO_4)_3.14 H_2O$, containing 8.24 wt. % $Al_2O_3$ and 23.28 wt. % sulfate ions. The resulting slurry is reacted at 60° C. for 75 minutes.

The batch composition is
$SiO_2/Al_2O_3 = 0.53$;
$Na_2O/SiO_2 = 0.50$;
$Al_2O_3/SO_4 = 0.45$; and
$H_2O/SO_4 = 20.01$.

The resulting solution forms a clear gel upon cooling to 20° C. The gel is broken up and dried at 105° C. for 16 hours. Milling the dry gel yields a finely divided pigment filler.

EXAMPLE 2

Preparation of Microspheres

A batch of clear hollow microspheres exhibiting a high degree of integrity which resist mechanical attrition is prepared by adding 1014.00 g of sodium alumino silicate slurry, 12.79 wt. % $Al_2O_3$ containing 15.05 wt. % $SiO_2$, and 7.77 wt. % $Na_2O$, to 4345.00 g of aluminum sulfate solution containing 8.24 wt. % $Al_2O_3$, and 23.28 wt. % sulfate ions, at 60° C. to obtain a sol in the form of a gelatinous solution. This sol is allowed to cool. Thereafter it is spray-dried at an inlet temperature of 1000° F. and an outlet temperature of 500° F. to yield small uniformly sized hollow microspheres.

EXAMPLE 3

Preparation of Insoluble Microspheres

The process of Example 2 is repeated except that the microspheres obtained from the spray-drying operation are then subjected to calcination by heating at a temperature of 600° C. for 1.5 hours. The resulting product is a hollow microsphere from which the bound sulfate has been eliminated so that the microsphere contains a porous network, the pores being about 100 Angstroms in size.

EXAMPLE 4

Preparation of a sodium oxide-alumina-silica-sulfate sol

A batch of sol product is prepared by adding 800.00 g of sodium alumina silicate slurry of the composition 1.17 wt. % $Na_2O$, 1.84 wt. % $Al_2O_3$, 2.92 wt. % $SiO_2$ at 60° C. to 1200.00 g of aluminum sulfate solution $Al_2(SO_4)_3.14 H_2O$, containing 8.24 wt. % $Al_2O_3$ and 23.28 wt. % sulfate ions at 60° C. The resulting slurry is maintained at 60° C. for 75 minutes.

The batch composition is:
$SiO_2/Al_2O_3 = 0.35$;
$Na_2O/SiO_2 = 0.40$;
$Al_2O_3/SO_4 = 0.38$; and
$H_2O/SO_4 = 30.03$.

The resulting solution formed a clear sol upon cooling. The sol can then be used as a binder or may be spray dried to produce the microspherical product.

Example 5

Preparation of resistant silica granules

In order to form a granulated silica product 1000.00 g of a dry powder precipitated silica is added to a mixer/pelletizer. The mixer is started resulting in a fluidization of the dry silica powder. While continuing mixing, 200.00 g of alumina-silica-sulfate sol of example 4 is added with 800.00 g of $H_2O$ at a rate of 10 m/min. Mixing is continued until all the sol is added and evenly dispersed on the silica. The granulated silica product is recovered, dried for 16 hours at 105° C., and screened to remove the very fine and very coarse fractions. The result is a free flowing granulated silica product.

The invention now being fully described, it will be apparent to one of ordinary skill in the art that many changes and modifications can be made thereto without departing from the spirit or scope of the invention as set forth herein.

What is claimed is:

1. A method of preparing an amorphous alumina-silica-sulfate of the formula $$xR:Al_2O_3:ySiO_2:zSO_4.pH_2O$$

wherein R is selected from the group consisting of alkali and alkaline earth metal oxides, transition metals capable of forming sulfate salts and mixtures thereof; x is about 0.001 to 0.5; y is about 0.01 to 3.00; z is about 0.01 to 3.00; and p is about 0 to 25.00, said method comprising
  (a) contacting a slurry comprising a source of reactive silicate and ions of an alkali metal, an alkaline earth metal or a transition metal capable of forming a sulfate salt, with an aqueous solution containing a source of reactive alumina and sulfate ions to form a mixed slurry, said silica, metal ions, alumina and sulfate being present in a proportion effective to form said alumina-silica-sulfate;
  (b) maintaining said mixed slurry under conditions of pH, temperature and pressure effective to form said alumina-silica-sulfate product; and
  (c) maintaining said mixed slurry at a temperature of about 15° to 98° C. and a pressure of about 15 to 100 psi for a period of time of about 5 minutes to 16 hours to form a colorless and optically clear sol.

2. The method of claim 1 wherein said reactive silicate and said metal ions are provided by compounds selected from the group consisting of alumino silicate salts, and zeolites.

3. The method of claim 1, wherein step (b) is conducted at a pH of 3 to 5, a temperature of 5° to 100° C. and a pressure of about 0 to 100 psi for a period of time of about 5 min to 16 hours.

4. The method of claim 1, further comprising drying said sol; and comminuting said dried sol to produce a particulate alumina-silica-sulfate product.

5. The method of claim 4, wherein said sol is dried at a temperature of about 50° to 300° C.; and said comminuting is done by milling to obtain alumina-silica-sulfate of a 1 to 10 μm particle size.

6. The method of claim 4, further comprising heating said alumina-silica-sulfate under conditions of temperature and pressure effective to form a calcined product.

7. The method of claim 1, further comprising spray-drying said sol to form alumina-silica-sulfate microspheres.

8. The method of claim 7, further comprising calcining said microspheres.

9. A rubber composition, comprising a rubber; and at least a bulking and reinforcing amount of an alumina-silica-sulfate containing a sulfate network of the formula $$xR:Al_2O_3:ySiO_2:zSO_4:pH_2O$$

wherein
  R is selected from the group consisting of alkali and alkaline earth metal oxides, transition metals capable of forming sulfate salts and mixtures thereof;
  x is about 0.001 to 0.5;
  y is about 0.01 to 3.00;
  z is about 0.01 to 3.00; and
  p is about 0 to 100.00.

10. The composition of claim 9, prepared from a batch composition comprising
  about 0.01–3.00 $SiO_2/Al_2O_3$;
  about 0.003–0.50 $R/SiO_2$;
  about 0.33–0.65 $Al_2O_3/SO_4$; and
  about 10.00–100.00 $H_2O/SO_4$.

11. The composition of claim 9, wherein
  R is $Na_2O$;
  x is 0.005 to 0.4;
  y is 0.02 to 2.85;
  z is 0.02 to 2.50; and
  p. is 0.1 to 100.00.

12. The composition of claim 9 wherein the alumina-silica-sulphate is in calcined form.

13. The composition of claim 9, wherein the alumina-silica-sulphate is in the form of microspheres having a particle size of about 1.0 to 200 μm.

14. The composition of claim 13, wherein the microspheres are hollow.

15. The composition of claim 13, wherein the microspheres are in amorphous form.

16. The composition of claim 9, wherein
  R is selected from the group consisting of oxides of Na, K, Li, Rb, Cs, Be, Mg, Ca, Sr, Ba, Ni, Co, Zn, Fe, Mn, Cr, Cd, Sn, Zr and mixtures thereof.

17. The composition of claim 14 wherein the hollow microspheres comprise a network of pores in the walls thereof, said microsphere comprising an alumina-silica-sulfate of the formula $$xR:Al_2O_3:ySiO_2:zSO_4.pH_2O$$

wherein
- R is selected from the group consisting of alkali and alkaline earth metal oxides, transition metals capable of forming sulfate salts and mixtures thereof;
- x is about 0.001 to 0.5;
- y is about 0.01 to 3.00;
- z is about 0.01 to 3.00; and
- p is about 0 to 100.00.

18. The composition of claim 17 wherein the hollow microspheres have pores which have a diameter of about 100 Angstroms or less.

19. A plastics composition comprising a plastic; and at least a bulking or reinforcing amount of an alumina-silica-sulfate containing a sulfate network of the formula $$xR:Al_2O_3:ySiO_2:zSO_4.pH_2O$$

wherein
- R is selected from the group consisting of alkali and alkaline earth metal oxides, transition metals capable of forming sulfate salts and mixtures thereof;
- x is about 0.001 to 0.5;
- y is about 0.01 to 3.00;
- z is about 0.01 to 3.00; and
- p is about 0 to 100.00.

20. The composition of claim 19, prepared from a batch composition comprising
- about 0.01–3.00 $SiO_2/Al_2O_3$;
- about 0.003–0.50 $R/SiO_2$;
- about 0.33–0.65 $Al_2O_3/SO_4$; and
- about 10.00–100.00 $H_2O/SO_4$.

21. The composition of claim 19, wherein
- R is $Na_2O$;
- x is 0.005 to 0.4;
- y is 0.02 to 2.85;
- z is 0.02 to 2.50; and
- p is 0.1 to 100.00.

22. The composition of claim 19 wherein the alumina-silica-sulphate is in calcined form.

23. The composition of claim 19 wherein the alumina-silica-sulphate is in the form of microspheres having a particle size of about 1.0 to 200 μm.

24. The composition of claim 23, wherein the microspheres are hollow.

25. The composition of claim 23 wherein the microspheres are in amorphous form.

26. The composition of claim 19 wherein
- R is selected from the group consisting of oxides of Na, K, Li, Rb, Cs, Be, Mg, Ca, Sr, Ba, Ni, Co, Zn, Fe, Mn, Cr, Cd, Sn, Zr and mixtures thereof.

27. The composition of claim 24 wherein the hollow microspheres comprise a network of pores in the walls thereof, said microsphere comprising an alumina-silica-sulfate of the formula $$xR:Al_2O_3:ySiO_2:zSO_4.pH_2O$$

wherein
- R is selected from the group consisting of alkali and alkaline earth metal oxides, transition metals capable of forming sulfate salts and mixtures thereof;
- x is about 0.001 to 0.5;
- y is about 0.01 to 3.00;
- z is about 0.01 to 3.00; and
- p is about 0 to 100.00.

28. The composition of claim 27 wherein the hollow microsphere of claim 44, wherein the pores have a diameter of about 100 Angstroms or less.

29. A paint composition, comprising a paint; and at least a bulking, reinforcing, opacifying a flatting amount of an alumina-silica-sulphate containing a sulfate network of the formula $$xR:Al_2O_3:ySiO_2:zSO_4.pH_2O$$

wherein
- R is selected from the group consisting of alkali and alkaline earth metal oxides, transition metals capable of forming sulfate salts and mixtures thereof;
- x is about 0.001 to 0.5;
- y is about 0.01 to 3.00;
- z is about 0.01 to 3.00; and
- p is about 0 to 100.00.

30. The composition of claim 29, prepared from a batch composition comprising
- about 0.01–3.00 $SiO_2/Al_2O_3$;
- about 0.003–0.50 $R/SiO_2$;
- about 0.33–0.65 $Al_2O_3/SO_4$; and
- about 10.00–100.00 $H_2O/SO_4$.

31. The composition of claim 19, wherein
- R is $Na_2O$;
- x is 0.005 to 0.4;
- y is 0.02 to 2.85; and
- p is 0.1 to 100.00.

32. The composition of claim 29 wherein the alumina-silica-sulphate is in calcined form.

33. The composition of claim 29 wherein the alumina-silica-sulfate is in the form of microspheres having a particle size of about 1.0 to 200 μm.

34. The composition of claim 33, wherein the microspheres are hollow.

35. The composition of claim 33 wherein the microspheres are in amorphous form.

36. The compositions of claim 33, wherein
- R is selected from the group consisting of oxides of Na, K, Li, Rb, Cs, Be, Mg, Ca, Sr, Ba, Ni, Co, Zn, Fe, Mn, Cr, Cd, Sn, Zr and mixtures thereof.

37. The composition of claim 34 wherein the hollow microsphere comprise a network of pores in the walls thereof, said microsphere comprising an alumina-silica-sulfate of the formula $$xR:Al_2O_3:ySiO_2:zSO_4.pH_2O$$

wherein
- R is selected from the group consisting of alkali and alkaline earth metal oxides, transition metals capable of forming sulfate salts and mixtures thereof;
- x is about 0.001 to 0.5;
- y is about 0.01 to 3.00;
- z is about 0.01 to 3.00; and
- p is about 0 to 100.00.

38. The composition of claim 37 wherein the hollow microspheres have pores which have a diameter of about 100 Angstroms or less.

39. A newsprint or paper composition, containing at least a filling, bulking or reinforcing amount of an alumina-silica-sulphate containing a sulfate network of the formula $$xR:Al_2O_3:ySiO_2:zSO_4.pH_2O$$

wherein

R is selected from the group consisting of alkali and alkaline earth metal oxides, transition metals capable of forming sulfate salts and mixtures thereof;

x is about 0.001 to 0.5;
y is about 0.01 to 3.00;
z is about 0.01 to 3.00; and
p is about 0 to 100.00.

40. The composition of claim 39, prepared from a batch composition comprising
about 0.01–3.00 $SiO_2/Al_2O_3$;
about 0.003–0.50 $R/SiO_2$;
about 0.33–0.65 $Al_2O_3/SO_4$; and
about 10.00–100.00 $H_2O/SO_4$.

41. The composition of claim 39, wherein
R is $Na_2O$;
x is 0.005 to 0.4;
y is 0.02 to 2.85;
z is 0.02 to 2.50; and
p is 0.1 to 100.00.

42. The composition of claim 39 wherein the alumina-silica-sulfate is in calcined form.

43. The composition of claim 39, wherein the alumina-silica-sulfate is in the form of microspheres having a particle size of about 1.0 to 200 μm.

44. The composition of claim 43, wherein the microspheres are hollow.

45. The composition of claim 39 wherein the microspheres are in amorphous form.

46. The composition of claim 39, wherein
R is selected from the group consisting of oxides of Na, K, Li, Rb, Cs, Be, Mg, Ca, Sr, Ba, Ni, Co, Zn, Fe, Mn, Cr, Cd, Sn, Zr and mixtures thereof.

47. The composition of claim 44 wherein the hollow microspheres comprise a network of pores in the walls thereof, said microsphere comprising an alumina-silica-sulfate of the formula $$xR:Al_2O_3:ySiO_2:zSO_4 \cdot pH_2O$$

wherein
R is selected from the group consisting of alkali and alkaline earth metal oxides, transition metals capable of forming sulfate salts and mixtures thereof;
x is about 0.001 to 0.5;
y is about 0.01 to 3.00; and
p is about 0 to 100.00.

48. The composition of claim 37 wherein the hollow microspheres have pores have a diameter of about 100 Angstroms or less.

* * * * *